United States Patent [19]

Picciotto et al.

[11] Patent Number: 4,687,268

[45] Date of Patent: Aug. 18, 1987

[54] CONNECTOR FOR PROVIDING ELECTRIC CONNECTION BETWEEN A PORTABLE ELECTRONIC DEVICE AND CONDUCTORS OF A FIXED PROGRESSING SYSTEM

[75] Inventors: Robert Picciotto, Paris; Francois Ramel, Levallois; Alain Rousseau; Philippe Touzin, both of Paris, all of France

[73] Assignee: Electronique CKD, France

[21] Appl. No.: 814,949

[22] Filed: Dec. 31, 1985

[30] Foreign Application Priority Data

Jan. 9, 1985 [FR] France ................................ 85 00226

[51] Int. Cl.⁴ ............................................ H01R 23/70
[52] U.S. Cl. ................................ 439/55 L; 200/51.09
[58] Field of Search ............. 339/17 L, 75 MP, 113 R, 339/113 L, 176 MP; 200/51.09, 51.1

[56] References Cited

U.S. PATENT DOCUMENTS 1,933,592 11/1933 Hubbell, Jr. ........................ 339/61 R
3,789,345 1/1974 Reimer et al. ..................... 339/75 MP
4,221,448 9/1980 Logerot et al. ................... 339/75 MP Primary Examiner—Neil Abrams
Attorney, Agent, or Firm—William A. Drucker

[57] ABSTRACT

A connector is provided for an electronic circuit card, and comprising a fixed structure with guide means in which the electronic circuit card may be engaged and slide according to an insertion direction until the electronic circuit card has reached a connection position, and a connection device comprising: a resiliently deformable portion mounted on a part of the fixed structure comprising fixed conductor elements, a support portion movable in translation, connected to the deformable portion and having contact elements, an abutment device integral with the deformable portion on which the electronic circuit card may bear during sliding thereof, so as to cause the support portion to be moved in the insert direction, conductor elements integral with the support portion and with the deformable portion and connecting said contact element to the conducting elements, and a detector adapted for detecting the presence of the electronic circuit card in the connection position.

13 Claims, 4 Drawing Figures

CONNECTOR FOR PROVIDING ELECTRIC CONNECTION BETWEEN A PORTABLE ELECTRONIC DEVICE AND CONDUCTORS OF A FIXED PROGRESSING SYSTEM

BACKGROUND OF THE INVENTION

1. Field of the Invention

The present invention relates to a connector for portable objects including an electric or electronic circuit such as an interchangeable electronic card for example, but not exclusively of the type of the electronic credit card described in patent France No. 2 337 381.

2. Description of the Prior Art

It is generally known that numerous solutions have already been proposed for providing the connection between such electronic cards and a fixed electronic processing system. These solutions usually comprise either devices with jaw and rocking lever carriage or devices with sliding contacts.

The devices with jaw and rocking lever carriage have the drawback of requiring a space-consuming assembly of delicate mechanical parts, because they are moving and so relatively costly. These devices, one embodiment of which is described in the patent France No. 2445 560, are therfore not well suited to integration in apparatus intended for the general public, some of which must be portable.

Furthermore, there exists at the present time a prejudice against using sliding contact connectors in this type of application. Thus, for example, the patent France No. 2 445 560 categorically rejects this solution for the following reasons:

the contact blades have to sweep a surface of the removable object (card) other than the output terminals, which would tend to increase the aging of the contacts;

the contact blades, considering the structure of the contact zones of the cards would pass successively over output terminals which do not correspond to them (arrangement in columns in the direction of handling the card), which would lead to restricitive safety measures for avoiding undesirable electric connections.

These remarks, which are justified if we take as basis the structure of certain sliding contact connectors used currently in other applications, do not take into account the different technological, ergonomic and economic aspects of the problem.

SUMMARY OF THE INVENTION

The invention provides then more particularly a connector of the above-described type which has a structure specially designed so as to be able to keep the advantages of sliding contact connectors while avoiding the above-mentioned disadvantages, so as to obtain more particularly:

a reduction of the overall size of the connector;

a simplification of the structure of the connector and a considerable reduction of its cost price;

a great suitability for industrial manufacture and at high production rates;

safety operation of the connection;

satisfactory robustness.

To obtain these results, the invention must then overcome said prejudices and resolve the problems specific to the connection of removable and portable electronic cards.

It should be noted first of all in this connection that, such as they are formed at present, these cards are designed so that the contact studs are spaced apart along two columns extending parallel to one of the edges of the card, the first column being situated at about 10 mm from this edge. These cards, which usually have a magnetic track, have then a compulsory direction of movement which is in the plane of the card and perpendicular to said edge.

Consequently, in order to prevent the contacts from touching other zones of the card than the contact studs which correspond thereto, it is necessary to provide a kinematical mechanism which transforms the movement of the card in the magnetic reading direction into another movement perpendicular to this direction, which applies the contacts to the card. A priori, this mechanism is necessarily space-consuming and expensive.

Furthermore, even with a jaw system, which ensures that the contacts only touch the studs which correspond to them on the card, a system for detecting the position of the card is required and a certain latitude in the positioning of the card for:

initiating the dialog of the card with the terminal;

allowing an accidental movement of the card during the exchange without interrupting the exchange.

This is why such a jaw system must develop towards a carriage system which accompanies the card over a distance of several millimeters, which further increases the complexity thereof, all the more so since the need of the electric connection involves the use of a flexible cable between the carriage and the terminal.

The invention provides a simple solution for all these problems.

It is based first of all on the fact that sliding contacts do not necessarily cause excessive wear either of the contacts or of the card. In fact, for a good electric contact to be made, a bearing force of the order of 10 g is sufficient, even for very high currents (cf. relay technology). That means that for eight contacts to be made, the total force normal to the card is 80 g. Now, the friction coefficient of a dry copper-copper gold-plated) contact or gold-plated copper on plastic, is of the order of 0.3 to 0.4. therefore, the force to be exerted by the user for introducing the card is of the order of 30 g, which is small from the ergonomic point of view. Similarly, from the mechanical point of view, the friction force, considering its low value, cannot damage either the contacts or the card. Experience moreover confirms this fact since a card has undergone 100 000 operations without damage prejudicial to its functioning.

Furthermore, it shows that by means of a simple structure it is possible to form a connector with sliding contacts for obtaining good positioning of the contacts on the studs which correspond thereto, even in the case where the card must undergo an appreciable movement, for example several millimeters, as well as simple and reliable detection of the position of the card.

It should be further noted that the invention is not limited to the connection of electronic cards.

In fact, it applies more generally to portable objects including an electric or electronic circuit and which have at least one contact face having one contact stud, at least one guide element and at least one stop or abutment element situated at a predetermined distance from said stud.

The connector comprises then a fixed structure comprising at least one fixed conductor for electric connection to said stud, as well as guide means in which said guide elements for the object may be engaged and slide along a given axis of movement as far as an end of travel position in which said contact face is in a given plane.

This connector is more particularly characterized by a connection device comprising:

a resiliently deformable part, fixedly mounted by one of its ends to the fixed structure and adapted so as to exert, at a distance from said end, a return force;

a part movable in translation parallel to said plane and at a small distance therefrom, this movable part being connected to the deformable part, at a distance from said end;

at least one contact holder element having a sliding contact member and connected to said movable part, this contact holder element projecting slightly with respect to said plane;

a stop device integral with said deformable part and/or the movable part, projecting in the gap between the plane of the movable part and said given plane, said stop device being situated at a distance from the contact element substantially equal to the distance between the stop element and said contact stud of the object, and at a position such that it is urged by the stop element of the object during sliding thereof in the guide means;

at least one conductor element integral with said sliding contact element of the movable part and of the elastically deformably part and providing electric continuity between said contact member and the fixed conductor element situated in the zone of the flexible part held fixedly on the fixed structure; and a validation contact adapted for detecting the presence of the object in a zone of the guide elements situated downstream of said stop device.

The operation of this connector is then the following: during engagement of the object in the guide means, the stop element of the object comes to bear on the stop device of the connection device and drives the movable part while causing elastic deformation of the deformable part. The contact face of the object is then positioned with respect to the movable part and, consequently, the contact element comes to bear on the contact stud.

During this movement, the relative movement of the object with respect to the movable part and, consequently with respect to the contact element remains very small. The contact element therefore remains applied against the contact stud.

At the end of the sliding travel, the object causes actuation of the validation contact.

In an advantageous embodiment of the invention, this validation contact comprises a flexible metal element on which there comes to bear a contact area provided on the elastically deformable part or on the return element which is associated therewith.

As mentioned above, the invention applies to the electric connection between an electronic card such as a credit card and a fixed processing system.

In this case, said two guide elements are formed by the side edges of the card and the guide means are formed by two slides in which said lateral edges are engaged. In this case, said stop element may simply be formed by the front edge of the card.

It should be noted that these slides may be rectilinear. However, for reducing or cancelling out the friction of the contacts on parts other than the studs, these slides may have a non rectilinear profile and may comprise a part widening out towards the card introduction orifice.

BRIEF DESCRIPTION OF THE DRAWINGS

Embodiments of the invention will be described hereafter by way of non limitative examples with reference to the accompanying drawings in which.

DESCRIPTION OF THE PREFERRED EMBODIMENTS

Figure 1:
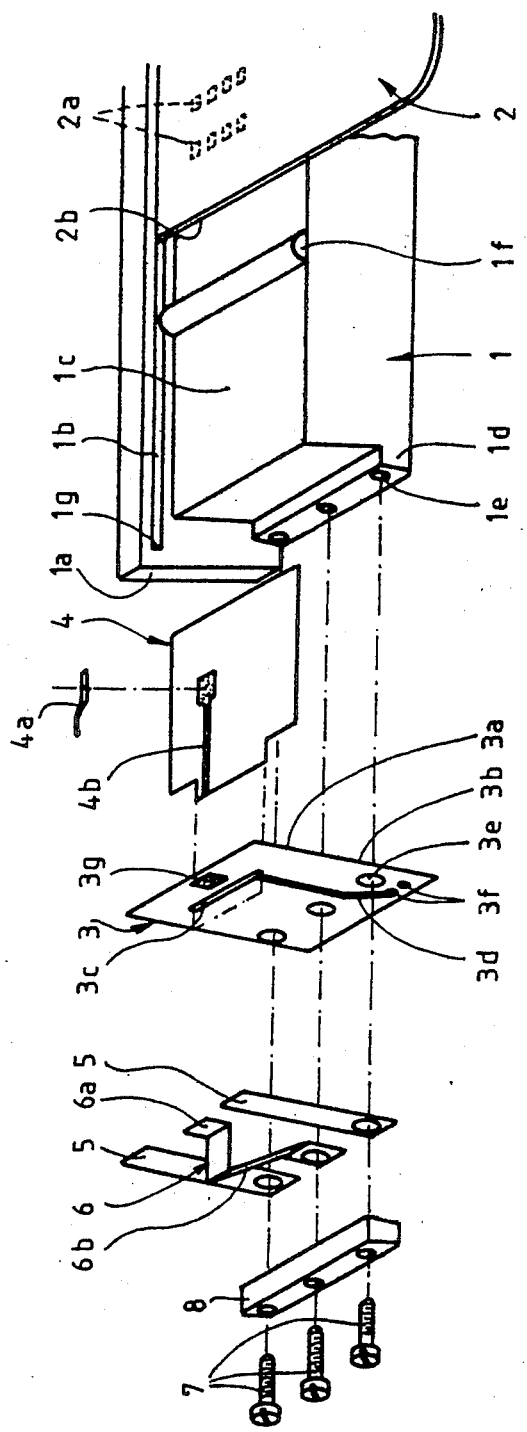
FIG. 1 is an exploded perspective view of a connector in a preferred embodiment of the invention.
Figure 2:
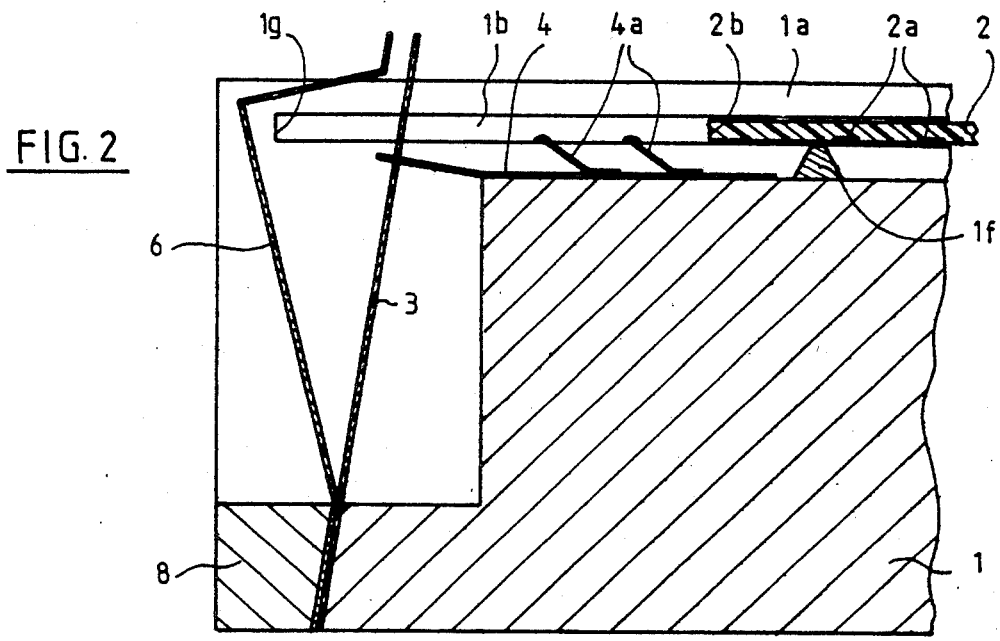
FIG. 2 is a schematical axial section of the connector shown in FIG. 1.

Such as shown in FIG. 1, the connector is formed first of all of a fixed structure comprising a case 1 of substantially parallelepipedic shape which may contain for example an electronic processing circuit. The two opposite lateral faces of this case 1 are equipped with two respective flanges 1a (only one of which has been shown) each having a slide 1b situated slightly above the upper face 1c of case 1 and intended to receive the two opposite side edges of an electronic card 2. This card 2 may then be engaged in slides 1b and slide with a very small clearance parallel to the upper face 1c of case 1.

The front face of case 1 comprises, in its lower part, a slight projection 1d having bores 1e on which are fixed, by means of screws 7 and a clamping piece 8;

a flexible piece 3, two return elements 5 formed by resilient spring blades, and a validation contact element 6 in the form of a tongue bent so as to form a contact member 6a situated substantially in line with a corresponding contact area 3g of the flexible piece 3, and at a small distance therefrom, and a flexible contact holder 6b.

The flexible piece 3 comprises, in its upper part, a mobile contact holder part 4 which comes into abutment against the upper face 1c of case 1.

On this contact holder part 4 is mounted a plurality of sliding contact elements 4a formed by flexible tongues, each of these contact elements 4a being intended to bear on a corresponding contact stud 2a of card 2.

For this, card 2 is introduced by its side edges in the slides 1b, so that its front edge 2b passes successively above a piece 1f made for example from rubber then above contact elements 4a which it rubs against for a longer or shorter time depending on the configuration of slide 1b, and finally comes into contact with the flexible piece 3 associated with the return elements 5. It will be noted that the rubber piece 1f serves for cleaning the contact studs 2a by rubbing and is intended to hold the card 2 in its final position.

At the moment when the front edge 2b of the card comes into contact with the upper part of the flexible piece 3 (which serves as stop), the arrangement of the contact elements means that the contacts 4a are already correctly placed on the contact studs 2a which correspond thereto. They will remain correctly placed until the card 2 reaches an end of travel stop 1g provided on slides 1b, the relative movement of the contact elements 4a over the contact studs 2a remaining always less than the length of the studs 2a.

Of course, in a similar embodiment, the flexible piece 3 could be directly soldered, at its lower end, to a rigid printed circuit integral with the fixed structure 1, supporting the electronic components required for the processing.

The movement of card 2 causes the flexible piece 3 and its associated return elements 5 to bend. At a certain point of such bending, the contact member 6a of the validation contact element 6 comes to bear on the contact area 3g of the flexible piece 3 (or possibly of one of its return elements 5). This engagement applies the voltage to contacts 4a. Conversely, when the card 2 is withdrawn, friction of contacts 4a on card 2 and the return force of the return elements 5 force the flexible piece 3 to accompany card 2 at least until the validation contact 6 moves away from the contact area of the flexible piece 3 (or that carried by the springs 5), thus interrupting application of voltage to contacts 4a before the contact elements 4a slide out of the surface of studs 2a.

In the example shown, the contact elements 4a are soldered to longitudinal metallizations 4b deposited on a flexible support forming the contact holder piece 4. This latter may then be formed from a printed circuit on epoxy glass of small thickness (10 or 15/100 mm) which slides over the upper face 1c of case 1, parallel to card 2.

In this example, the flexible piece 3 may be advantageously formed by a printed circuit wafer on epoxy glass of small thickness (10 or 15/100 mm). It comprises, in its upper part, a slit 3c in which is engaged the front end of the contact holder piece 4 and; in its lower part, at the level of the projection 1d of case 1, a series of metallized holes 3f whose number corresponds to that of the contact elements and which are intended to receive a conventional connector not shown able for a connection with a fixed electronic processing system. This wafer also comprises a series of metallizations 3d connecting each of the metallized holes 3f to a position of slit 3c through which a corresponding metallization 4b of the contact holder piece 4 passes.

The mechanical and electrical connection between the contact holder piece 4 and the flexible piece 3 is provided by soldering the corresponding metallizations 3d, 4b of these two pieces.

Of course, the flexible piece 3 comprises, also at the level of the projection 1d of the case 1, holes 3e which the screws pass through for clamping, through the clamping piece 8, the return elements 5 and the validation contact element 6. Thus, the flexible piece 3 remains naturally applied against the return elements 5, at rest as well as during the movements of the card 2.

Figure 3:
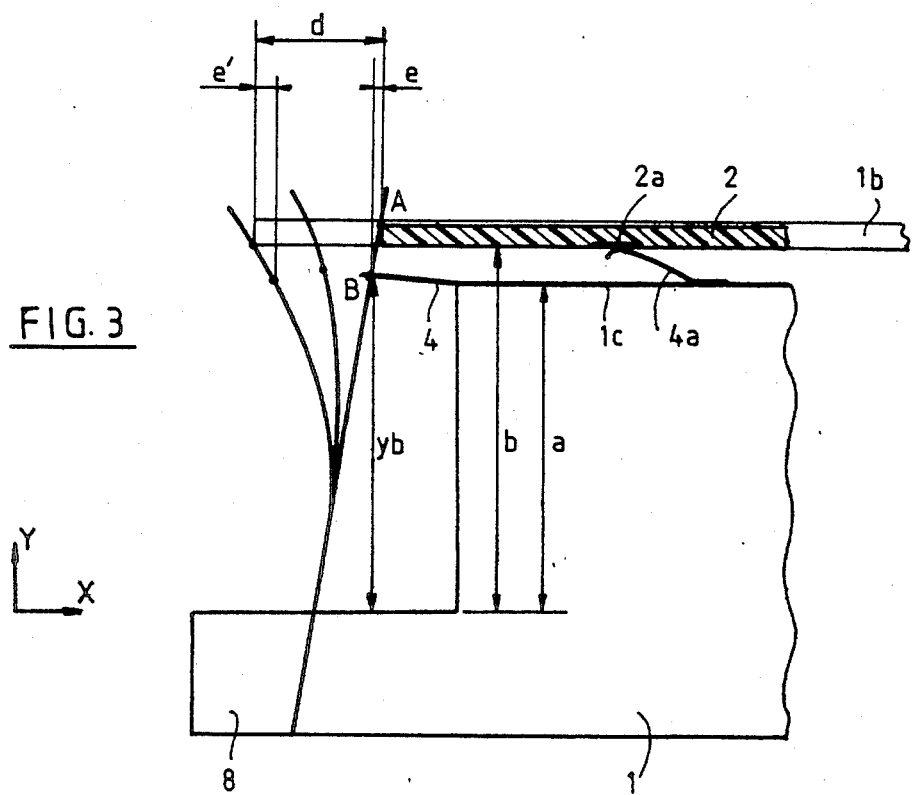
FIG. 3 is a schematical section of the connector for illustrating the operating principle of the connector.

FIG. 3 shows how a considerable movement of card 2 relative to case 1, for example of 5 mm, may only cause a relative movement of the order of a few 1/10 mm, of contacts 4a on studs 2a, from the moment when card 2 is in contact with piece 3. If A is the point of contact of the card with the flexible piece 3 and B the junction point between pieces 3 and 4, the relative movement of contacts 4a over studs 2a is the difference of the abscissa variations of points A and B, namely (e+e') during the movement d of the card. It can be seen that this distance is all the smaller the closer the ordinates of these points are together, that is to say the closer the junction B of pieces 3 and 4 is to the contact point A. Thus the relative sliding of contacts 4a over studs 2a may be adjusted by adapting the geometry of the connector. Such sliding, which causes self cleaning of the contacts, is therefore added to the other devices tending to clean, either the contacts 4a or the studs 2a, namely:

the rubber 1f which rubs against studs 2a, and rubbing of the contacts 4a on the card 2 before positioning thereof.

For example, for a connector which may be readily accomodated in existing positions, a dimension b is chosen equal to 15 mm, and a dimension a equal to 13.5 mm. If dimension $y_b$ is chosen equal to 14.5 mm, the relative movement (e+e') for a movement d of 5 mm is 0.5 mm, so perfectly compatible with the size of the contact studs defined by the standard ISO/DIS 2894 (namely 2 mm). These different dimensions are further compatible with construction of pieces 3 and 4 as a printed circuit on epoxy glass of small thickness (10 or 15/100 mm). The return elements 5 are formed for example of beryllium copper blades, 5 mm in width and 15/100 mm in thickness. These elements bend at the contact point of card 2 by 0.9 mm under the effect of the friction force of 30 g and exert, for a deflection of 5 mm, a force of 160 g on the card, which is broken down into two components of substantially equivalent values:

one, in the direction of slide 1b, which tends to push the card out of the connector and which must be compensated for by an equal friction force of the part of the cleaning rubber 1f and of the friction on slide 1b (static frictions this time);

the other, in the direction perpendicular to slide 1b, which tends to apply the card against the edge of slide 1f and so to immobilize card 2.

In this construction, the fixed part 3b of the flexible piece 3 and the contact elements 4a are in the same half space with respect to the plane of the card; a device may of course be formed in which the fixed part 3b of the flexible piece 3 and contacts 4a are situated on each side of the plane of the card, this arrangement having the advantage of further reducing the space required by the system.

Furthermore, the great flexibility of the card such as it is specified in the standard which defines it may be used, by giving the slide 1a a non rectilinear profile, so that studs 2a only engage contacts 4a when the card begins to drive the flexible piece 3; such an arrangement would result in reducing or cancelling out the friction of contacts 4a on parts of the card other than studs 2a.

Figure 4:
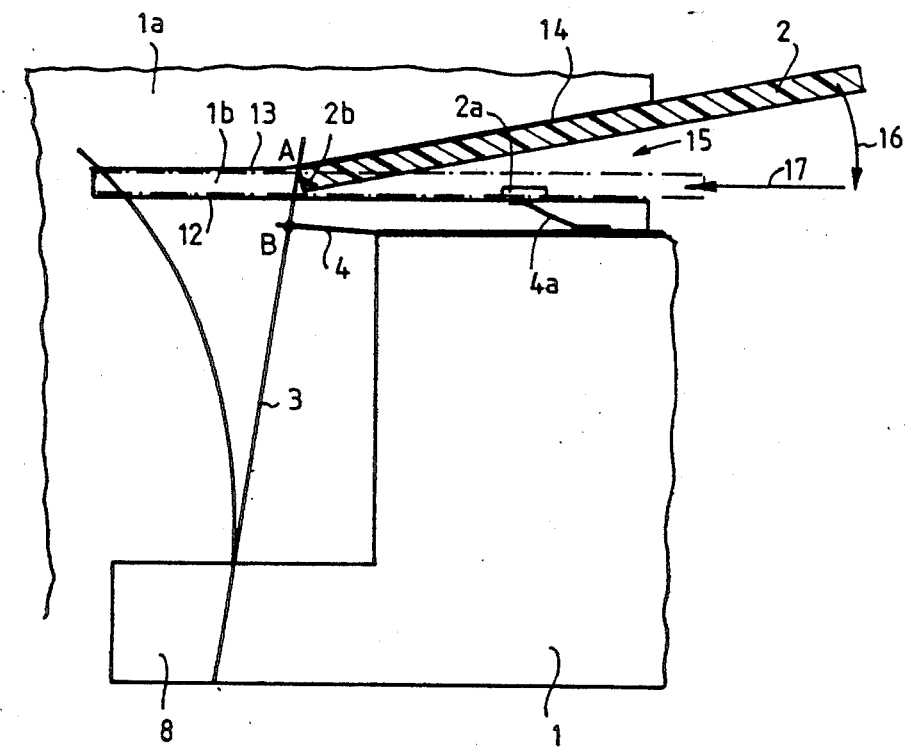
FIG. 4 is a schematical axial section of a variant of a connector in accordance with the invention.

FIG. 4 illustrates such an arrangement. In this Figure, slide 1b comprises a lower rectilinear edge 12 and an upper edge comprising, on the one hand in its front part, a rectilinear portion 13 parallel to the lower edge 12 and, on the other hand, in its rear part, an oblique portion 14 connected to the rectilinear part at the level where the upper abutment part of the flexible piece 3 extends.

Slide 1b therefore has a part widening out towards the orifice 15 for introducing card 2, so that this latter may be engaged obliquely in the position shown with continuous lines.

In this position, the front edge 2b of card 2 comes into abutment against the upper part of the flexible piece 3, which ensures positioning thereof with respect to the contact holder piece 4.

In a following phase, card 2 is brought down against the lower edge 12 of slide 1b (arrow 16) which causes the contact elements 4a to be applied to the contact studs 2a.

Then the front part of card 2 is engaged in the front part 12, 13 of slide 1b by applying to card 2 a pressure opposing that of the return elements 5 (arrow 17).

At the end of travel, card 2 is held in position as in the preceding example.

It is clear that this solution has the further advantage of considerably facilitating introduction of the card 2 and limiting the risks of jamming which might occur following slight deformations of the card and/or following the introduction of dust.

What is claimed is:

1. Connector for a portable electronic device having a plane contact face provided with a plurality of contact studs, at least one guide portion and at least one abutment element, this connector comprising a fixed structure having for each of said contact studs, one corresponding fixed conductor, first guiding means in which said guide portion may be engaged and slide according to an insertion direction until said electronic device has reached a connection position in which said phase contact face extends in a determined plane, and a connection device which comprises:
   a resiliently deformable portion having an end portion fixedly mounted on a part of the fixed structure which includes the fixed conductors;
   a support portion guided by a second guiding means provided on the fixed structure, so as to be movable in translation parallel to said determined plane and at a small distance therefrom, said support portion being connected to a connecting zone of the resiliently deformable portion which is distant from said end portion;
   a plurality of resiliently deformable contact holders fixedly mounted on said support portion and each comprising a sliding contact member projecting slightly with respect to said determined plane and located so as to bear on a corresponding stud at least when said electronic device is in said connection position;
   an abutment device integral with said resiliently deformable portion and with said support portion, said abutment device being urged by the abutment element of the electronic device when its slides in said first guiding means in said insertion direction, so as to cause the support portion to be moved and the resiliently deformable portion to be deformed, the distance between said abutment device and each of said sliding contact members being substantially equal to the distance between the abutment element and one corresponding contact stud of the electronic device;
   a plurality of conductor elements integral with said support portion and said resiliently deformable portion, each of said conductor elements connecting a contact holder to a corresponding fixed conductor;
   detection means responsive to the movement of the electronic device along said first guiding means for detecting the presence of the electronic device in said connection position.

2. The connector as claimed in claim 1, wherein said resiliently deformable portion is reinforced by at least one resiliently deformable element.

3. The connector as claimed in claim 1, wherein said detection means comprises a flexible metal element on which comes to bear a contact area provided on said resiliently deformable portion.

4. The connector as claimed in claim 2, wherein said detection means comprises a flexible metal element on which comes to bear a contact area provided on said resiliently deformable element.

5. The connector as claimed in claim 1, further comprising an element adapted to provide friction with the contact studs of the electronic device during engagement thereof in said first guiding means.

6. The connector as claimed in claim 1, wherein said support portion consists of a first printed circuit wafer of small thickness, said conductor elements comprise a first plurality of metallizations provided on said printed circuit wafer, and said contact holders are welded on said metallizations.

7. The connector as claimed in claim 6, wherein said first printed circuit wafer is slidingly supported by a flat surface of the fixed structure.

8. The connector as claimed in claim 6, wherein said resiliently deformable portion consists of a second printed circuit wafer of small thickness comprising a second plurality of metallizations adapted for respectively connecting said first plurality of metallizations to said fixed conductors.

9. The connector as claimed in claim 8, wherein said first printed circuit wafer is fixed to said second printed circuit wafer by soldering said first plurality of metallizations to said second plurality of metallizations.

10. The connector as claimed in claim 8, wherein said second printed circuit wafer comprises a slit in which is engaged one end of the first printed circuit wafer.

11. The connector as claimed in claim 1, wherein said electronic device consists of an electronic circuit card having two opposite guiding edges and said first guiding means are formed by two slides in which said guiding edges may be introduced and slide.

12. The connector as claimed in claim 11, wherein said slides have a rectilinear profile.

13. The connector as claimed in claim 11, wherein said slides each comprise a rectilinear lower edge and an upper edge comprising, in its front part, a rectilinear portion paralllel to the lower edge, and, in its rear part, an oblique portion connected to the rectilinear portion substantially at the level where said abutment device of the connection device extends.

* * * * *